United States Patent [19]

Kamada et al.

[11] 4,027,642

[45] June 7, 1977

[54] INTAKE AIR HEATING DEVICE FOR USE IN INTERNAL COMBUSTION ENGINE

[75] Inventors: Naoki Kamada, Hitachi; Nobutoshi Hasebe, Ibaraki, both of Japan

[73] Assignee: Hitachi, Ltd., Japan

[22] Filed: Aug. 12, 1975

[21] Appl. No.: 603,791

[30] Foreign Application Priority Data

Aug. 14, 1974 Japan .................... 49-92373

[52] U.S. Cl. ............... 123/122 G; 123/122 D; 123/179 H; 432/222
[51] Int. Cl.² ......................... F02M 31/00
[58] Field of Search ........ 123/34 A, 122 G, 179 H, 123/142.5, 122 D; 432/222

[56] References Cited

UNITED STATES PATENTS

| | | | |
|---|---|---|---|
| 1,377,989 | 5/1921 | Good | 123/122 G |
| 1,408,277 | 2/1922 | Ensign | 123/122 G |
| 1,803,684 | 5/1931 | Woolson | 123/122 G |
| 2,388,213 | 10/1945 | Mock | 123/122 D |
| 3,561,901 | 2/1971 | Jackson | 432/222 |

*Primary Examiner*—Ronald H. Lazarus
*Attorney, Agent, or Firm*—Craig & Antonelli

[57] ABSTRACT

This invention relates to an intake air heating device in an internal combustion engine. The intake air heating device comprises means for guiding flames from a flame holding or baffle cylinder to an intake pipe, the aforesaid means being attached to one end of the flame baffle cylinder integrally secured to the body proper of the intake air heating device and projecting into the interior of an elbow portion of the intake pipe, or secured to the inner wall of the elbow portion of the intake pipe which faces said one end of the flame baffle cylinder, so that the intake air heating device may fulfill the intake-air heating function when mounted on the elbow portion of the intake pipe connecting an air cleaner with an engine.

7 Claims, 8 Drawing Figures

INTAKE AIR HEATING DEVICE FOR USE IN INTERNAL COMBUSTION ENGINE

BACKGROUND OF THE INVENTION

The construction of an intake air heating device of the prior art has been such that the device includes a flame baffle cylinder, a combustion chamber and a fuel injection nozzle, and the flame baffle cylinder is located within an intake pipe, so as to introduce combustion gases from the outer periphery of the flame baffle cylinder into the intake pipe. Such an intake air heating device has been widely known, for example, as a combustion type, intake air heating device.

The intake air heating device of the prior art, however, must be secured to the linear portion of an intake pipe, because of its construction failing to accommodate itself to the bent elbow portion. Should the intake air heating device of the type be secured to the elbow portion, there would arise a difference in the velocity of streams of intake air flowing through the transverse cross sectional area of the elbow portion of the pipe, leading to the failure to provide satisfactory combustion as well as the failure to maintain the well balanced temperature for intake air, and thus the intake air heating device could not fulfil its inherent function.

In the meantime, an intake pipe leading to a Diesel engine, in most cases, has an elbow portion because of the construction of the engine itself, and there occasionally arises the need to secure the intake air heating device to the elbow portion of the intake pipe from the viewpoint of space, etc. In such a case, the type of an engine to which the intake air heating device can be secured has to be limited, because of the construction of the device itself.

SUMMARY OF THE INVENTION

It is a primary object of the present invention to provide an intake air heating device suited for being secured to an elbow portion of an intake pipe of an internal combustion engine.

It is a secondary object of the present invention to provide an intake air heating device which is less in pressure lose, light in weight and easy to handle.

It is a third object of the present invention to provide an intake air heating device which facilitates to avail a combustor or the like in common with engines of a different type, and which is simple enough to secure same to an intake pipe.

To attain the objects described, an intake air heating device of the present invention comprises means for guiding flames from a flame baffle cylinder to an intake pipe, said means being secured to one end of the flame baffle cylinder or an inner wall of an elbow of the intake pipe which faces said one end of the flame baffle cylinder. The provision of the guide means makes it possible to secure the intake air heating device to the elbow portion of the intake pipe. Since a proper frame guide is only attached to the flame baffle cylinder, the parts of the device may be used in common with other devices of this type, thus permitting the use of the intake air heating device with an engine of any type, as desired, as well as facilitating to secure same to an intake pipe of such an engine.

DETAILED DESCRIPTION OF THE INVENTION

Figure 1:
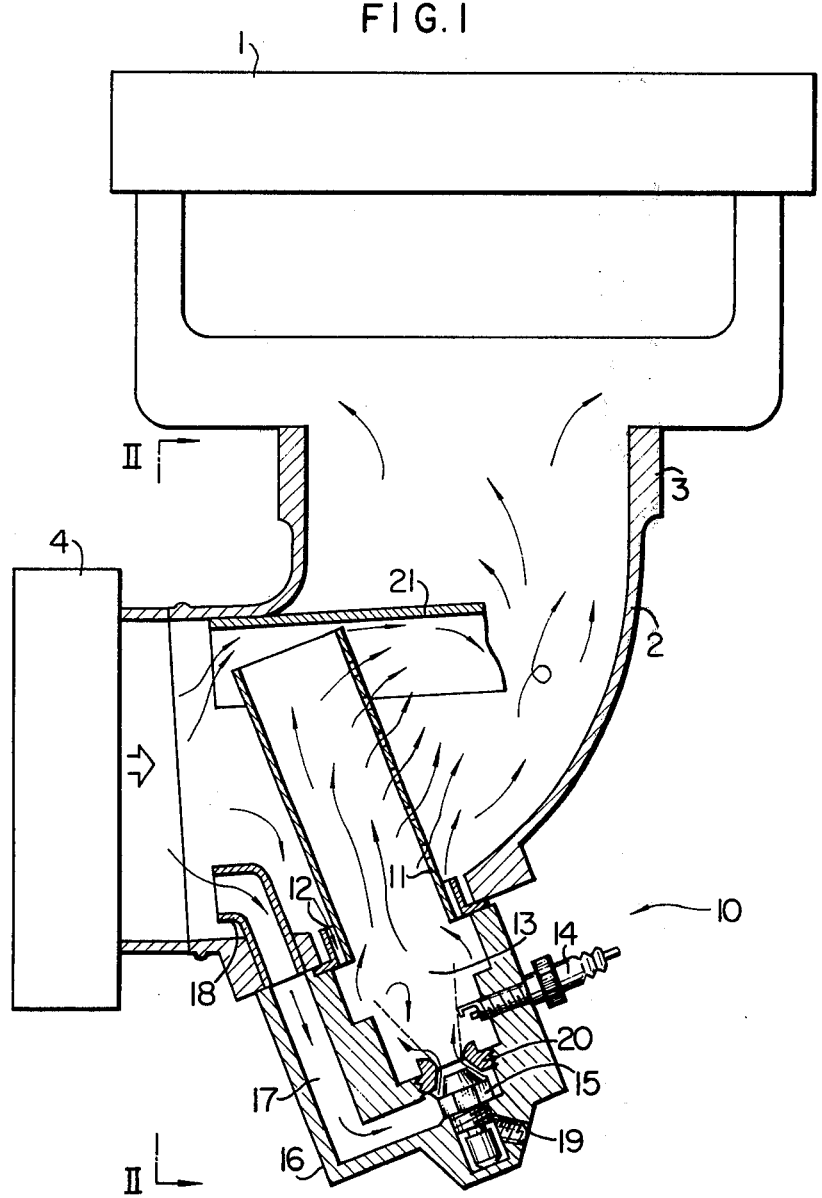
FIG. 1 is a longitudinal cross-sectional view of an essential part of an intake air heating device for use in an internal combustion engine, according to a first embodiment of the present invention.
Figure 2:
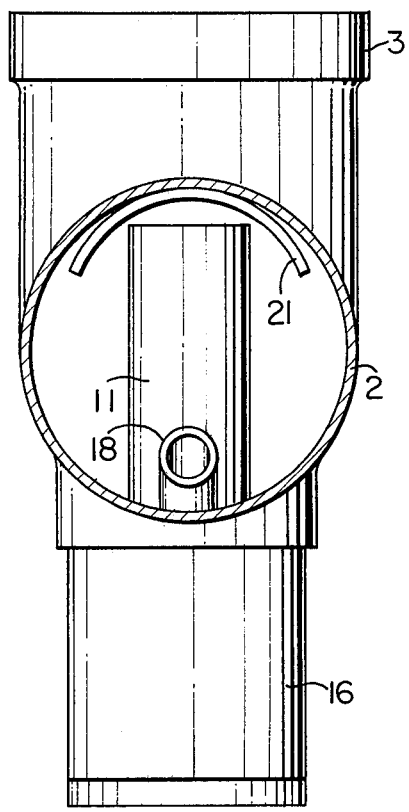
FIG. 2 is a longitudinal cross-sectional view taken along the line II—II of FIG. 1, as viewed in the direction of arrow.

Description will be given to embodiments of the present invention, in which the intake air heating device is substantiated, with reference to the accompanying drawings. Referring to FIGS. 1 and 2 showing a first embodiment of the intake air heating device, shown at 1 is an engine such as a Diesel engine, which is connected to an intake pipe 3 having an elbow portion 2. The intake pipe 3 in turn is connected to an air cleaner 4. An intake air heating device of the present invention is generally designated by reference numeral 10. The intake air heating device 10 has a flame baffle cylinder 11 projecting into the interior of the elbow portion 2 of the intake pipe 3, an air guide 12 surrounding the outer periphery of the flame baffle cylinder 11, which is positioned close to the elbow portion 2, so as to introduce air therefrom, and a body proper 16 attached to the elbow portion 2 of the intake pipe 3 in addition to a combustion chamber 13, ignition plug 14 and injection nozzle 15. The combustion chamber 13 is communicated by way of a passage 17 with a clean air intake port 18. Shown at 19 is a fuel intake port and at 20 a nozzle cover.

The intake air heating device 10 further has a guide plate 21 which is secured to the inner wall of the elbow portion 2 of the intake pipe 3 in a manner to substantially cross the flame baffle cylinder 11. The guide plate 21, as is best seen in FIG. 2, is of a substantially semi-cylindrical shape, so that air flowing through the intake pipe 3 and flames from the flame baffle cylinder 11 will be suitably guided along the guide plate. The guide plate 21 should recommendably be secured to the inner wall of the elbow portion 2 such as by welding or by means of attaching bolts.

In operation, negative pressure is created in the intake pipe 3 due to the flame baffle cylinder 11 projecting therein, such that air is introduced from the upstream side of the flame baffle cylinder into the combustion chamber 13. On the other hand, fuel is injected into the combustion chamber 13 through the injection nozzle 15, and then mixed with air thus introduced, to be fired by the ignition plug 14. The flames produced due to combustion are introduced under suction into the intake pipe through the through-holes provided on the side wall of the flame baffle cylinder 11 which is located on the down-stream side.

The aforesaid construction is the same of the conventional intake air heating device having no semicylindrical guide means 21. In the case of the intake air heating device of the prior art, however, if same is attached to the elbow portion of the intake pipe, as shown in FIG. 1, air streams flowing therethrough provide a uniform flow through the transverse cross section of the elbow perpendicular to the pipe, so that there arises a pressure difference in the portion adjacent to the flame baffle cylinder, resulting in the failure to provide good combustion. Furthermore, the quantity of flame being introduced under suction from the through-holes of the flame baffle cylinder 11 into the intake pipe varies so that the intake air heating device of the prior art fails to uniformly heat intake air in the intake pipe, as well as to introduce air of a constant temperature into an engine connected to the downstream sides of the intake pipe branched.

In the present invention, since the guide plate 21 is attached to the inner wall of the elbow portion 2 of the intake pipe 3, as set forth in the foregoing, air streams in the elbow portion are guided by the guide plate 21, to thereby provide parallel streams in the vicinity of the flame baffle cylinder, likewise in the linear portion of the intake pipe. Thus, the velocities of streams of air through the transverse cross section in the vicinity of the flame baffle cylinder 11 become uniform, and good combustion in the intake air heating device is achieved, while intake air may be uniformly heated.

Figure 3:
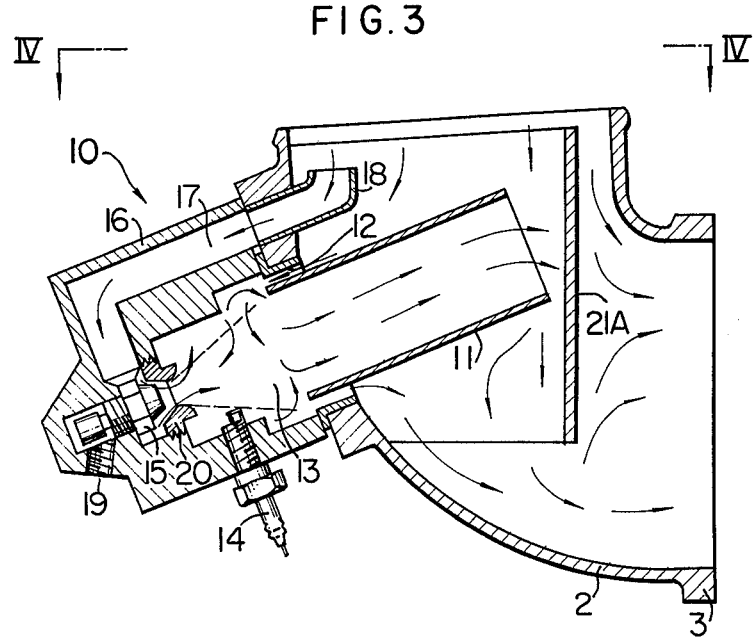
FIG. 3 is a longitudinal cross-sectional view of an essential part of the device showing a second embodiment.
Figure 4:
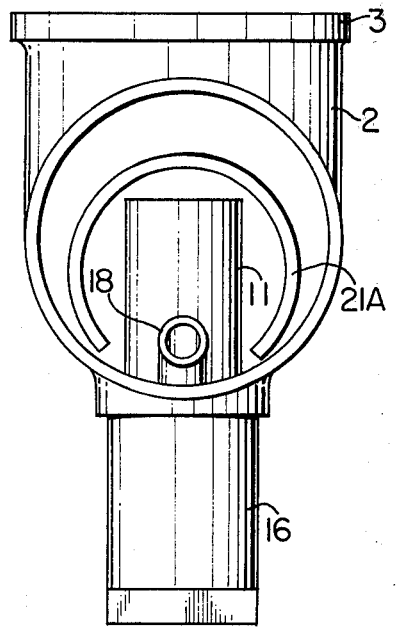
FIG. 4 is a longitudinal cross-sectional view taken along the line IV—IV of FIG. 3, as viewed in the direction of arrow.
Figure 5:
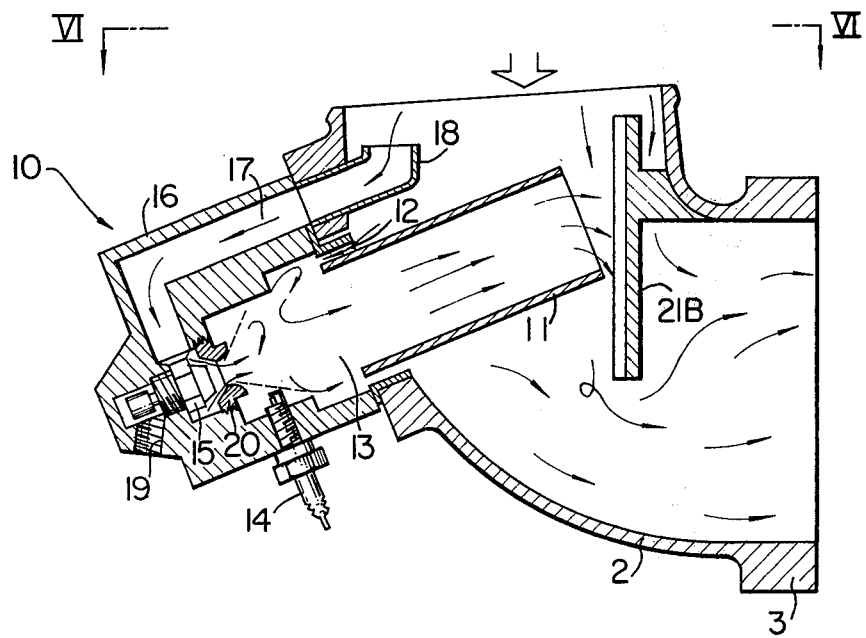
FIG. 5 is a longitudinal cross-sectional view of an essential part of the device showing a third embodiment.
Figure 6:
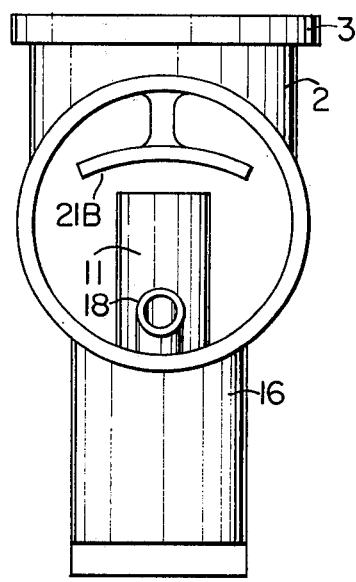
FIG. 6 is a longitudinal cross-sectional view taken along the line VI—VI of FIG. 5, as viewed in the direction of arrow.

FIGS. 3 and 4 and FIGS. 5 and 6 illustrate the second and third embodiments of the intake air heating device of the present invention, respectively. In respective embodiments, a guide plate 21A or 21B is provided, which is similar in function to that of the first embodiment, but different in shape and attachment to the elbow portion. In the case of the guide plates 21A and 21B, their shape and the way to secure same to the elbow portion are selected according to an extent of a bend of the elbow portion and the difference in the air stream passages on the upstream side of the elbow portion and on the downstream side thereof, so as to provide an optimum air streams in the vicinity of the flame baffle cylinder 11 as well as an optimum flame condition in the flame baffle cylinder 11. In the embodiment of FIGS. 3 and 4, the guide plate 21A is substantially of a cylindrical shape and attached to a portion of the inner wall of the elbow portion, which portion is adjacent to the body proper of the intake air heating device 16, so that a space relating to combustion may be provided and air streams are well controlled, while flames on the downstream side of the flame baffle cylinder may be positively guided. The guide member may be substantially a flat plate, as shown in the embodiment of FIGS. 5 and 6, depending upon an extent of the bend of the elbow portion 2 of the intake pipe 3 and the condition of the downstream side of the intake pipe. Such a flat plate may fulfil its function.

According to the present invention, the guide member is provided in the intake pipe, so that the intake air heating device may be secured to the elbow portion of the intake pipe, with the assurance of providing the satisfactory combustion in the intake air heating device as well as the uniform heating of intake air in the intake pipe. As a result, local red heat in the elbow portion is avoided. Furthermore, the intake air heating device may be availed for any type Diesel engine, with the resulting enlargement of a market for the device. Furthermore, the body proper of the device may be used in common to other type engine only by modifying a shape of the guide member, and this is advantageous from the economical viewpoint.

Figure 7:
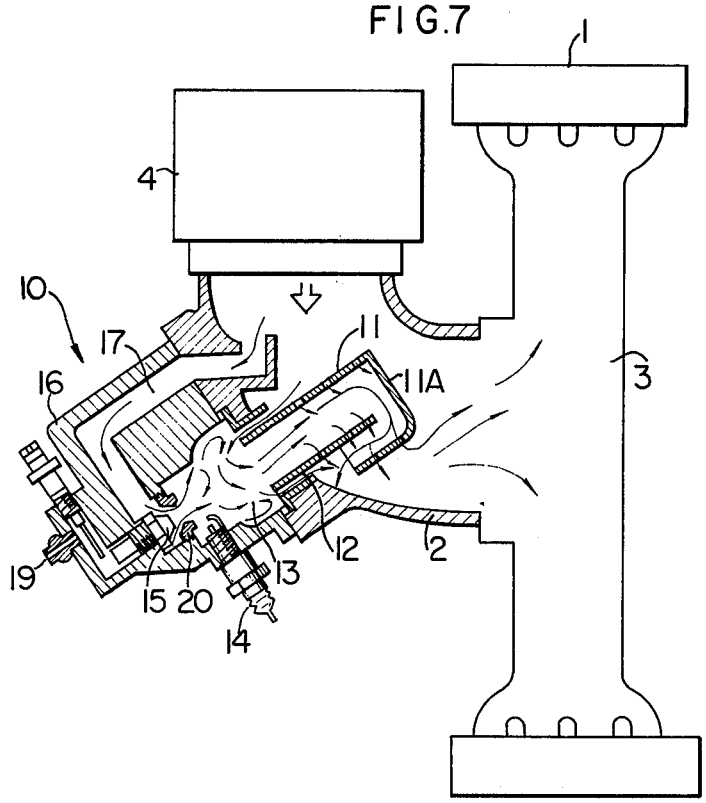
FIG. 7 is a longitudinal cross-sectional view of an essential part of the device showing fourth embodiment; and, FIG. 8 is a longitudinal cross-sectional view of an essential part of the device showing a fifth embodiment.

Referring to FIG. 7 showing a fourth embodiment, the flame baffle cylinder 11 has an end-covering member 11A in a manner that part of the end-covering member 11A overlaps the wall of the flame baffle cylinder 11 which is located on the downstream side, so that part of the flame baffle cylinder 11 gives a double-wall construction. Thus, flames produced due to combustion in the device are introduced under suction through a passage in the aforesaid double-walled portion of the flame baffle cylinder 11 on the downstream side thereof as well as through a gap between the air guide 12 and the wall of the flame baffle cylinder 11 into the elbow portion of the intake pipe.

Since part of the flame baffle cylinder is of a double construction, even if the flame baffle cylinder is secured to the elbow portion of the intake pipe, as shown in FIG. 7, the directions and velocities of flames being introduced under suction from the cylinder into the elbow portion 2 may be controlled, with the assurance of providing a proper pressure difference as well as satisfactory combustion.

Figure 8:
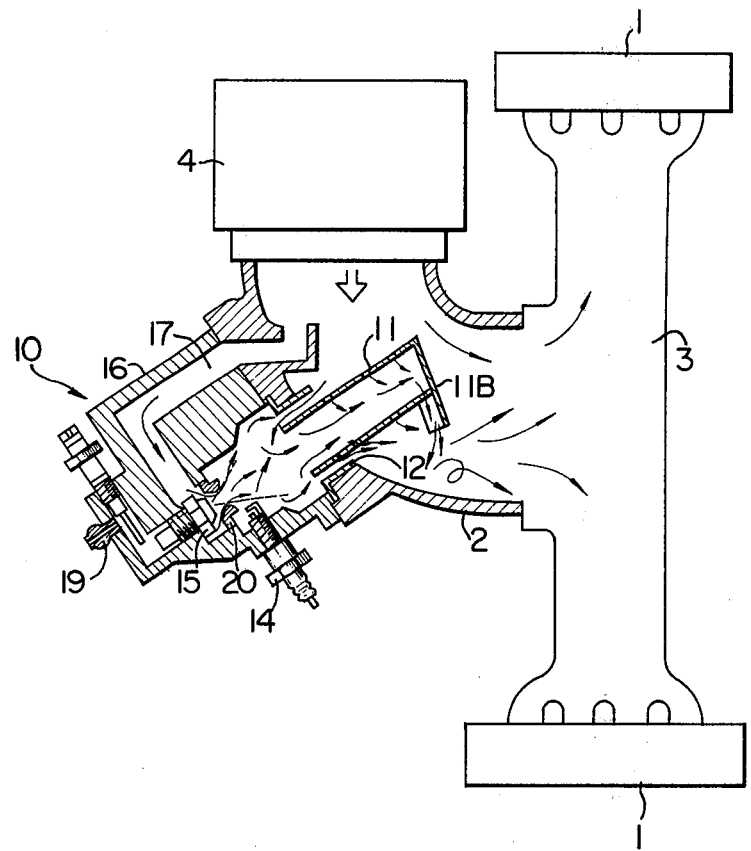

A fifth embodiment is shown in FIG. 8. In this embodiment, a flat or semi-cylindrical guide member 11B is secured to one end or bottom of the flame baffle cylinder 11 in a manner to project towards the downstream side of the cylinder, and serves to control the direction of flames from the flame baffle cylinder 11. The flat or semi-circular guide member 11B contributes to facilitating heat exchange between intake air and combustion gases and the mixing of intake air with combustion gases in the vicinity of the flame baffle cylinder 11, as well as contributes to uniformly heating the intake air at a constant temperature, and hence permitting a uniform temperature rise in the intake pipe.

What is claimed is:

1. In an intake air heating device including means for introducing fuel from a tank disposed outside said device and injecting fuel into a combustion chamber; an electrically controlled ignition plug disposed in the vicinity of an injection nozzle for firing the fuel which has been thus injected into the combustion chamber; and a flame baffle cylinder for guiding combustion flames to an intake pipe leading to an engine; the improvements comprising;

said flame baffle cylinder piercing through the wall of an elbow from outside into the interior thereof, said elbow serving as part of an air intake pipe and, means for guiding flames from said flame baffle cylinder to the intake pipe, said means being secured to the inner wall of said elbow in the vicinity of one end of said flame baffle cylinder.

2. An intake air heating device as defined in claim 1, wherein the guide means is rigidly secured to the inner wall of said elbow which faces one end of said flame baffle cylinder.

3. An intake air heating device as defined in claim 1, wherein said guide means is substantially of a semi-cylindrical member and disposed in a manner to encompass said flame baffle cylinder, with the opposite ends of said guide means secured to the inner wall of the elbow.

4. An intake air heating device as defined in claim 2, wherein said guide means is substantially of a semi-cylindrical member and disposed to encompass said one end of said flame baffle cylinder.

5. An intake air heating device as defined in claim 2, wherein said guide means is an arcuate plate which faces said one end of said flame baffle cylinder, said arcuate plate being nearly flat in curvature.

6. An intake air heating device as defined in claim 1, wherein said guide means includes an end covering member for said one end of said flame baffle cylinder, said end covering member having a part overlapping part of the wall of said flame baffle cylinder, thereby providing a double-wall construction.

7. An intake air heating device as defined in claim 1, wherein said guide means includes a portion of said flame baffle cylinder extending toward the downstream side of said air intake pipe.

* * * * *